United States Patent
Ferguson

(10) Patent No.: US 10,761,213 B2
(45) Date of Patent: Sep. 1, 2020

(54) SYSTEMS AND METHODS FOR RECEIVING INFORMATION AT ROVER RECEIVERS IN NAVIGATION SATELLITE SYSTEMS

(71) Applicant: Trimble Inc., Sunnyvale, CA (US)

(72) Inventor: Kendall Ferguson, Stafford, VA (US)

(73) Assignee: Trimble Inc., Sunnyvale, CA (US)

( * ) Notice: Subject to any disclaimer, the term of this patent is extended or adjusted under 35 U.S.C. 154(b) by 397 days.

(21) Appl. No.: 15/882,782

(22) Filed: Jan. 29, 2018

(65) Prior Publication Data
US 2018/0164443 A1  Jun. 14, 2018

Related U.S. Application Data

(62) Division of application No. 14/601,412, filed on Jan. 21, 2015, now Pat. No. 9,915,736.

(60) Provisional application No. 61/930,790, filed on Jan. 23, 2014.

(51) Int. Cl.
| | | |
|---|---|---|
| *G01S 19/07* | (2010.01) | |
| *G01S 19/04* | (2010.01) | |
| *G01S 19/43* | (2010.01) | |

(52) U.S. Cl.
CPC ............ *G01S 19/071* (2019.08); *G01S 19/04* (2013.01); *G01S 19/07* (2013.01); *G01S 19/43* (2013.01)

(58) Field of Classification Search
CPC ......... G01S 19/04; G01S 19/07; G01S 19/071
See application file for complete search history.

(56) References Cited

U.S. PATENT DOCUMENTS

| | | |
|---|---|---|
| 5,420,592 A | 5/1995 | Johnson |
| 5,731,786 A | 3/1998 | Abraham et al. |
| 8,044,848 B2 | 10/2011 | Yeh |
| 8,044,849 B2 | 10/2011 | Ferguson et al. |
| 9,915,736 B2 | 3/2018 | Ferguson |
| 2005/0146461 A1 | 7/2005 | Pande et al. |
| 2012/0286991 A1 | 11/2012 | Chen et al. |

(Continued)

OTHER PUBLICATIONS

Talbot, N., "Compact Data Transmission Standard for High-Precision GPS," Proceedings of ION-GPS 96, Kansans City, (1996), 12 pages.

(Continued)

*Primary Examiner* — Bernarr E Gregory
*Assistant Examiner* — Fred H Mull
(74) *Attorney, Agent, or Firm* — Kilpatrick Townsend & Stockton LLP

(57) ABSTRACT

A navigation satellite system, one or more NSS reference station is set out for providing information to one or more rover receivers. The NSS reference station comprises a processing unit configured to determine one or more first range intervals representing first ambiguity windows based on estimated atmospheric effects, and determine one or more second range intervals representing a second ambiguity window smaller than each of the first ambiguity windows based on uncertainties of range measurements within a predetermined previous period. The NSS reference station further comprises a transmission unit configured to transmit, to the NSS rover receivers, first messages each comprising a modulo a first ambiguity window, and transmission of two first messages, to range measurement transmit between the NSS rover receiver, a plurality of second messages, each second message comprising a range measurement modulo one of the second ambiguity windows.

13 Claims, 6 Drawing Sheets

(56) References Cited

U.S. PATENT DOCUMENTS

2015/0355341 A1 12/2015 Ferguson
2015/0369924 A1 12/2015 Hedgecock et al.

OTHER PUBLICATIONS

U.S. Appl. No. 14/601,412 Restriction Requirement dated Jan. 13, 2017, 6 pages.
U.S. Appl. No. 14/601,412 Non-Final Office Action dated Apr. 10, 2017, 14 pages.
U.S. Appl. No. 14/601,412 Notice of Allowance dated Oct. 13, 2017, 9 pages.

SYSTEMS AND METHODS FOR RECEIVING INFORMATION AT ROVER RECEIVERS IN NAVIGATION SATELLITE SYSTEMS

CROSS-REFERENCE TO RELATED APPLICATIONS

The present application is a divisional of U.S. application Ser. No. 14/601,412, filed Jan. 21, 2015, which claims priority to U.S. Provisional Application No. 61/930,790, filed Jan. 23, 2014, both of which are incorporated herein by reference in their entirety for all purposes.

TECHNICAL FIELD

The present invention relates to the field of satellite navigation systems. More particularly, the invention relates to stations and methods for providing information to rover receivers. The information may be used for satellite navigation applications, such as for example precise point positioning.

BACKGROUND

Navigation satellite systems (NSS) provide functionalities to rovers such that the rover is able to determine its position. Examples of a rover include navigations systems, mobile phones and the like. Navigation satellite systems include global navigation satellite systems (GNSS) as for example the Global Positioning System (GPS), the GLONASS system, the Galileo system, the BeiDou system and others. Navigation satellite systems may however not necessarily cover the complete globe and can be restricted to a certain area or region on earth.

A technique known as Real-Time Kinematic (RTK) positioning is commonly used to improve the positioning accuracy in a NSS. RTK uses one or more reference stations at fixed locations on the surface of the earth. A reference station continuously measures or otherwise obtains its distance from various satellites. The measured distance is compared with the known distance between the reference station and the satellite which can be modeled based on the position of the reference station and the orbit of the satellite. The difference between the measured distance and the modelled distance are transmitted to nearby rover stations. The rover stations can then use the received difference to improve its positioning. With this technique, a positioning accuracy in the order of centimeters can be reached.

Alternatively, the satellite measurements and reference station position used to compute these corrections can be transmitted to rover stations, allowing various methods at the rover to be used to improve its position. Although the transmitted data in this case do not comprise actual corrections, the term Real-Time Corrections (RTC) is commonly used in the GNSS industry to describe both types of transmitted data. Hereafter, Real-Time Corrections (RTC) shall be used to describe a combination of satellite measurements and reference station positions.

Real-Time Corrections (RTC) that are delivered to one or more rover stations can be generated by a single reference station, a network of local reference stations, or a wide-area or global network of reference stations. When a plurality of reference stations is used, these may be connected to a computer server which delivers the Real-Time Corrections (RTC) to the rover stations.

For the purposes of the description, it can be assumed that the RTC stream applies to a single reference station.

The Real-Time Correction (RTC) data offered by the reference station enables many of the systematic errors affecting the rover to be removed or reduced. For example, the rover measurements can be affected by error sources such as satellite clock, satellite orbit, ionosphere bias, tropospheric bias. The satellite clock errors vary over time. Ionospheric and tropospheric errors have both spatial and temporary variation.

The data transmission from the reference station to the rover station can be performed via data links such as radio/modem, cellular phone networks, satellite radio communications, or the internet. This data transmission is preferably performed in real time. When a plurality of reference stations is connected to a computer server, the server may complete the connection to the rover stations using any of the said data links. When the internet is used, the data link may use internet protocols such as TCP-IP, UDP or PPP.

The bandwidth of these data links is of crucial importance when performing high-precision, real-time NSS positioning. For example, many radio/modems have an effective bandwidth throughput of 9,600 bits per second. Satellite based data links are very expensive to lease and therefore it is advantageous to limit the correction information sent via satellites. Also data transmission via a cellular phone network is expensive. Therefore, the data size of the correction data should be kept to a minimum.

Furthermore, many data links are not 100% reliable, i.e. they are subject to outages and bit errors. Therefore, the method used for transmitting the correction data from a reference station to the rover station should have a certain robustness with respect to outages of the data link.

In 2013, there are currently approximately 75 navigation satellites in space including 31 GPS satellites, 24 GLONASS (Russia) satellites, 14 BeiDou (BDS) (Chinese) satellites, 4 Galileo (EU) satellites and 1 QZSS (Japanese) satellite. The number of satellites will grow over the next decades. Furthermore, new navigation satellites will broadcast on 3 frequency bands, rather than just 2. The expansion of satellite count and satellite signals will lead to a natural increase in the amount of information that needs to be distributed in the RTC stream for high-precision, real-time NSS positioning applications.

In view of the above, a reference correction data format should consider:
  size: The amount of data sent should be minimized without compromising the precision of the content. Small data content leads to a reduction in correction latency;
  robustness: The format should be resilient to bit errors on the data stream. A single lost packet should not cause a flow on loss of further information;
  extendibility: Corrections for new satellites systems and signals should be readily included in the data format; and simplicity: the encode/decode algorithms should be as simple and computationally efficient as possible.

There are some prior art correction formats precision NSS applications. One example is the compact measurement record (CMR) format which is for example described in Nick Talbot, "Compact Data Transmission Standard for High-Precision GPS", proceedings of ION-GPS 96, Kansas City, 1996.

Spatial Data Compression

The CMR format is based around a spatial data compression algorithm. NSS pseudorange measurements have a range of 20,000 to 25,000 kilometers with a required precision of around 1 centimeter. Instead of sending out the full pseudorange measurement, the pseudorange modulo 1 light millisecond (about 300 kilometer) is sent. This spatial data compression algorithm greatly reduces the number of bits required to transmit the pseudorange data. The ambiguity in the pseudorange data is readily reconciled by the approximate ordinates of the reference station and the coordinates of each satellite obtained from the broadcast orbits. This is an example of compressing the satellite measurements rather than generating corrections, although the term Real-Time Corrections (RTC) is commonly used in the GNSS industry for all types of compression methods.

NSS carrier phase measurements have millimeter level precision and similar range to NSS pseudorange measurements. In the CMR format, NSS carrier phase measurements are transmitted as offsets relative to the respective satellite pseudorange measurement. This approach again reduces the range of the transmitted parameters. Likewise, carrier phase and pseudorange measurements on the secondary frequency band (for example in GPS the L2 frequency) are sent as offsets relative to the primary (e.g. GPS L1) frequency band.

The CMR format has been further improved to the CMRx format (see for example U.S. Pat. No. 8,044,849). The CMRx format includes more complex spatial data compression algorithms that deliver a very high level of spatial data compression. The CMRx format exploits the intrinsic properties of the NSS observations. For example, the tropospheric delay of the NSS signals is accurately accounted for using a standard (simplified Hopfield) model.

The user-satellite range is by far the largest component of NSS measurement that needs to be encoded/decoded in real-time, high-precision NSS positioning applications. NSS satellite locations are known to approximately 10 meters from the respective broadcast ephemerides. The location of the transmitting reference station is known and broadcast as part of the CMRx message. Therefore, the combination of reference station location and the NSS orbital information allows the user satellite-range to be computed at reference stations and rover stations. Instead of using the full user satellite range, just a portion of the measurements needs to be sent.

FIG. 1 shows this compression by illustrating a single satellite being tracked by a reference receiver. The position of the satellite is known to an accuracy of around 10 meters (orbit uncertainty) using the orbit information broadcast by the satellite. Furthermore, the reference receiver location is also known to a very high precision. Therefore, the distance between the reference receiver and the satellite is known to high precision. Thus, the carrier phase measurements do not need to be transmitted in full but can be transmitted modulo an ambiguity window representing a range of a particular size (e.g. 100 meters). The size of the ambiguity window needs to be carefully considered. A too small window size may result in an ambiguity in the broadcast carrier phase measurement. A too large window size increases the magnitude of the quantities that need to be encoded.

A major advantage of the spatial data compression scheme is that it is insensitive to changes in the broadcast NSS ephemerides parameters. For example, GPS satellites broadcast a new orbit and clock information every few hours. Each update of the broadcast ephemerides is marked by a change to the issue of data ephemeris (IODE) flag in the data. Normally each update causes up to meter level jumps in the computed (modelled) satellite locations. Some data formats handle IODE changes by including the IODE flag in the data.

Temporal Data Compression

NSS satellites today move in an inclined geo geosynchronous orbit (IGEO), an equatorial geo synchronous (GEO) or medium earth orbit (MEO). The apparent angular rate of the satellites is relatively low (around 0.5 degrees per minute for MEO). Atmospheric errors are also relatively slowly changing. For example under stable ionospheric conditions, the ionospheric bias typically changes by 1-10 millimetres/second (mm/s) for rising MEO satellites and 1-5 mm/s for satellites overhead. Similarly, tropospheric error rates are on the order of 10 mm/s for rising satellites and a few mm/s for satellites overhead.

Furthermore, the acceleration of the satellites with respect to the user-satellite range is quite constant and readily modeled over time. The relatively constant satellite acceleration means that errors in the reference station coordinates propagate as slow variation in the reference station-to-satellite computed range (~a few mm/s for an error in the reference station coordinates of say 2 m). Similarly, satellite ephemeris errors, for a given issue of data, cause slow variation in the computed ranges (<1 mm/s).

Because of the intrinsic stability of the satellite atomic frequency standards, satellite clock error growth is generally around 1-2 mm/s.

Satellite signals can be reflected off objects surrounding the receiving antenna, thus inducing signal multipath errors. Multipath errors for a station receiver often exhibit correlation times between 5 and 120 s.

In view of these considerations, temporal compression exploits the slow time variation of NSS measurements. Normally temporal compression algorithms divide transmissions into major and delta epochs. The major epochs (reference epochs) contain fully reconstructable NSS observations. The delta epochs are referred back to the last major epoch. FIG. 2 shows an example of a temporal compression. In the example shown in FIG. 2, four delta messages are transmitted between two reference messages.

The advantage of the major/delta temporal compression scheme is that the average size of the transmitted data is reduced. However, FIG. 3 shows a disadvantage of the temporal compression scheme. FIG. 3 shows that the data packet size peaks at the time of transmission of the major messages. Thus, the data transmission is not evenly distributed over time. This can cause problems if the peaks exceed the data link bandwidth even though the average data packet size is below the data link bandwidth. Furthermore, the temporal data compression scheme has a weakness in that the loss of a single major packet leads to the subsequent loss of dependent delta messages. This is particularly problematic when the data link is unreliable. Furthermore, some techniques require issue of data ephemeris information in messages which adds complexity.

In view of the above, the present invention aims at providing a technique to reduce the amount of correction data transmitted in RTK applications without degrading the robustness with respect to data link outages.

SUMMARY OF THE INVENTION

To achieve or at least partially achieve the above mentioned aim, reference stations, methods, computer programs and systems according to the invention are defined in the independent claims. Particular embodiments are defined in the dependent claims, and are explained in the present description.

In one embodiment, a navigation satellite system, NSS reference station is set out for providing information to one or more rover receivers. The NSS reference station comprises a processing unit configured to determine one or more first range intervals representing first ambiguity windows based on estimated atmospheric effects, and determine one or more second range intervals representing a second ambiguity window smaller than each of the first ambiguity windows based on uncertainties of range measurements within a predetermined previous period. The NSS reference station further comprises a transmission unit configured to transmit, to the NSS rover receivers, first messages each comprising a range measurement modulo a first ambiguity window, and transmit between transmission of two first messages, to the NSS rover receiver, a plurality of second messages, each second message comprising a range measurement modulo one of the second ambiguity windows.

Since the second ambiguity windows are smaller than each of the first ambiguity windows, the size of the second messages is reduced. Therefore, the transmission bandwidth can be used more efficiently.

Since the second ambiguity windows are determined based on uncertainties of range measurements within a predetermined previous period, it can be ensured that the second ambiguity windows are not too small. Thereby, the robustness of the transmission against poor data links is secured.

It is to be noted that the second messages can be decoded even if the previous first message has not been received. In other words, the decoding of the second message does not rely on the reception of the first message, i.e. the NSS reference station does not employ a pure major/delta approach. From the second message the full carrier phase measurement can be reconstructed. Therefore, the robustness of the data transmission is improved.

In one embodiment, a method is set out for providing information from a NSS reference station to a NSS rover receiver. The method comprises the steps of determining one or more first range intervals representing first ambiguity windows based on estimated atmospheric effects, determining one or more second range intervals representing second ambiguity windows smaller than each of the first ambiguity windows based on uncertainties of range measurements within a predetermined previous period, transmitting, from the NSS reference station to the NSS rover receivers, first messages each comprising a range measurement modulo a first ambiguity window, and transmitting between transmission of two first messages, from the NSS reference station to the NSS rover receiver, a plurality of second messages, each second message comprising a range measurement modulo one of the determined second ambiguity windows.

In one embodiment, a computer program loadable onto a processing unit of a NSS reference station is provided comprising code for executing a method as described above.

In one embodiment, a NSS rover receiver is provided for receiving information from a NSS reference station. The NSS rover receiver comprises a reception unit configured to receive, from the NSS reference station, first messages each comprising a range measurement modulo a first range interval representing a first ambiguity window, and receive between reception of two first messages, from the NSS reference station, a plurality of second messages, each second message comprising a range measurement modulo a second range interval representing a second ambiguity window, the second ambiguity window being smaller than each of the first ambiguity windows. The NSS rover receiver further comprises a processing unit configured to reconstruct a range measurement based on at least a received second message.

In one embodiment, a method is provided for providing information from a navigation satellite system, NSS, reference station to one or more NSS rover receivers. The method comprises the step of receiving, at the NSS rover receiver, first messages each comprising a range measurement modulo a first range interval representing a first ambiguity window. The method further comprises the step of receiving, at the NSS rover receiver, between reception of two first messages, from the GNSS reference station, a plurality of second messages, each second message comprising a range measurement modulo a second range interval representing a second ambiguity window, the second ambiguity window being smaller than each of the first ambiguity windows. The method further comprises the step of reconstructing a range measurement based on at least a received second messages.

In one embodiment, a computer program loadable onto a processing unit of a navigation satellite system, NSS, rover receiver comprising code for executing a method as set out above is provided.

In one embodiment, a system is provided comprising a NSS reference station as set out above and a NSS rover receiver as set out above.

DETAILED DESCRIPTION

Figure 1:
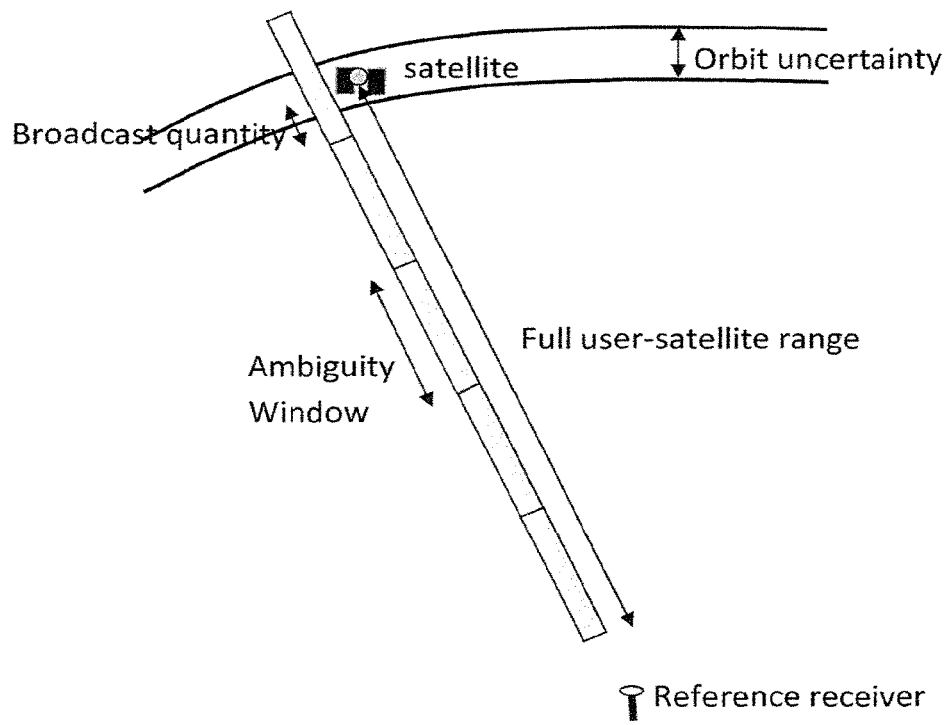
FIG. 1 shows a spatial compression of a user-satellite range measurement according to the prior art.
Figure 2:
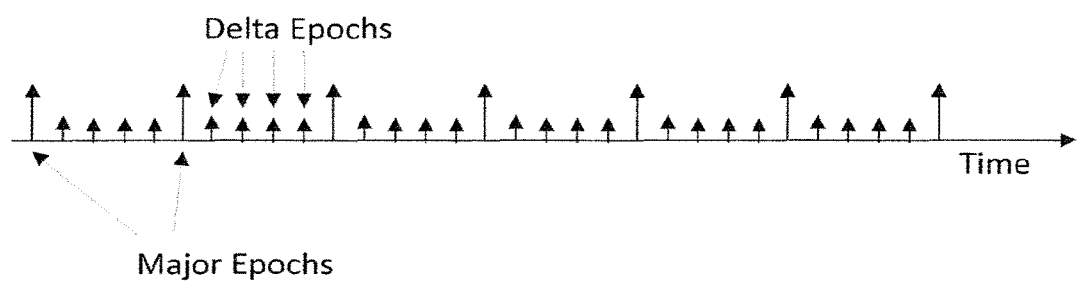
FIG. 2 shows a temporal compression of a user-satellite range measurement according to the prior art.
Figure 3:
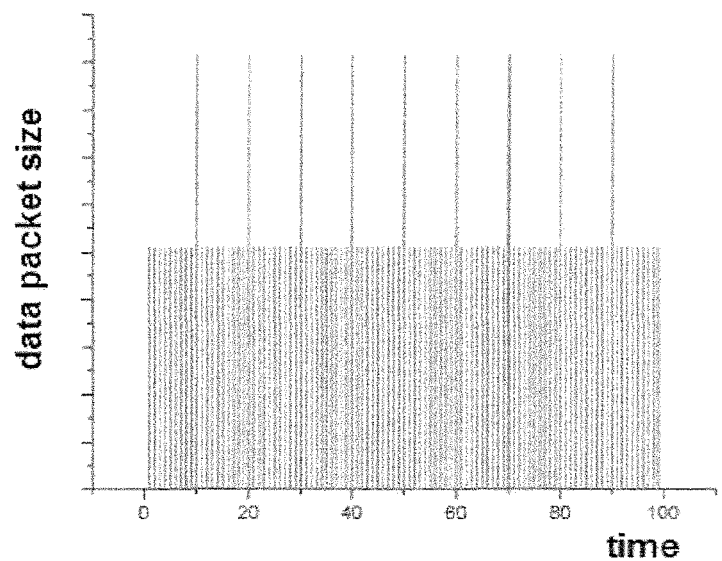
FIG. 3 shows the data packet size in a RTC transmission when using a temporal compression of a user-satellite range measurement according to the prior art.
Figure 4:
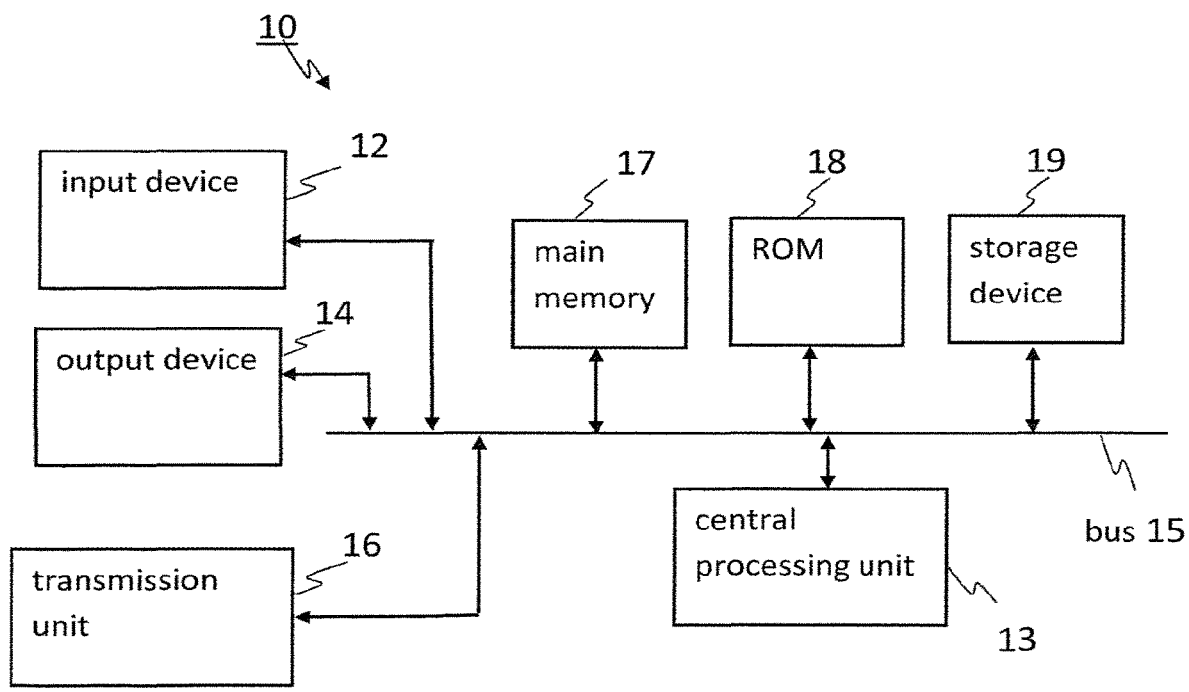
FIG. 4 is a schematic diagram of an exemplary hardware implementation of a NSS station that may carry out a method in accordance with embodiments of the invention.

FIG. 4 is a schematic diagram of an exemplary hardware implementation of a NSS station 10 that may carry out a method in accordance with embodiments of the invention.

The NSS station may for example be a reference station or a rover receiver. As illustrated, NSS station 10 may include a bus 15, a central processing unit (CPU) 13, a main memory 17, a ROM 18, a storage device 19, an input device 12, an output device 14, and a communication interface 16. Bus 15 may include a path that permits communication among the components of the NSS station 10.

The CPU 13 may include a processor, a microprocessor, or processing logic that may interpret and execute instructions. Main memory 17 may include a RAM or another type of dynamic storage device that may store information and instructions for execution by CPU 13. ROM 18 may include a ROM device or another type of static storage device that may store static information and instructions for use by CPU 13. Storage device 19 may include a magnetic and/or optical recording medium and/or solid state medium (Flash memory) and its corresponding drive.

Input device 12 may include a mechanism that permits an operator to input information to processing entity 10, such as a keypad, a keyboard, a touch-sensitive device, a mouse, a pen, voice recognition and/or biometric mechanisms, etc. Output device 14 may include a mechanism that outputs information to the operator, including a display, a printer, a speaker, etc. Communication interface 16 may include any transceiver-like mechanism that enables processing entity 10 to communicate with other devices and/or systems. For example, communication interface 16 may include mechanisms for communicating with another device or system via a network.

The NSS station 10 may perform certain operations or processes described herein. These operations may be performed in response to CPU 13 executing software instructions contained in a computer-readable medium, such as main memory 17, ROM 18, and/or storage device 19. A computer-readable medium maybe be defined as a physical or a logical memory device. For example, a logical memory device may include memory space within a single physical memory device or distributed across multiple physical memory devices. Each of main memory 17, ROM 18 and storage device 19 may include computer-readable media. The magnetic and/or optical recording media (e.g., readable CDs or DVDs or Blu-ray/BDs) and/or solid state media of storage device 19 may also include computer-readable media. The software instructions may be read into main memory 17 from another computer-readable medium, such as storage device 19, or from another device via communication interface 16.

The software instructions contained in main memory 19 may cause CPU 13 to perform operations or processes described herein. Alternatively, hardwired circuitry may be used in place of or in combination with software instructions to implement processes and/or operations described herein. Thus, implementations described herein are not limited to any specific combination of hardware and software.

The NSS station 10 may be a NSS reference station. The navigation satellite system reference station may provide information to one or more NSS rover receiver(s) and comprise a processing unit 13 to determine one or more first range intervals representing first ambiguity windows based on estimated atmospheric effects, and to determine one or more second range intervals representing second ambiguity windows smaller than each of the first ambiguity windows based on uncertainties of range measurements within a predetermined previous period. Moreover, the NSS reference station may comprise a transmission unit 16 to transmit, to the NSS rover receiver(s), first messages each comprising a range measurement modulo a first ambiguity window, and to transmit between transmission of two first messages, to the NSS rover receiver(s), a plurality of second messages, each second message comprising a range measurement modulo one of the second ambiguity windows.

The messages include range measurements modulo the ambiguity windows, and thus the size of the message can be reduced. Nevertheless, as it is assured that the respective ambiguity window (range interval) is larger than the difference between the predicted range and the measured range, the range can be reconstructed at the rover.

The second ambiguity windows are smaller than each of the first ambiguity windows and the size of the second messages is thus reduced. A transmission bandwidth can be used more efficiently.

Moreover, if the second ambiguity windows are determined based on uncertainties of range measurements within a predetermined previous period, it can be ensured that the second ambiguity windows are not too small. Thereby, the robustness of the transmission against poor data links is secured.

The second messages advantageously each include all information needed for determining the position of the rover, i.e. they can be decoded even if the previous first message has not been received. In other words, the decoding of the second message does not rely on the reception of a recent first message providing that at least one first message has been received since the NSS rover receiver started to receive messages, i.e. the NSS reference station does not employ a pure major/delta approach. From the second message the full carrier phase measurement can be reconstructed. Therefore, the robustness of the data transmission is improved.

A range measurement corresponds to a measurement performed by the NSS reference station to measure the distance between the NSS reference station and a satellite. The measurement may for example be a code-based pseudorange measurement or a carrier-phase-based measurement.

Each of the first and second ambiguity windows corresponds to a range or distance that is measured in units of length such as meters. Other units such as degrees, cycles, or radians could be chosen provided that there is consistency between units when transmitting both code-based pseudorange measurements and carrier-phase-based measurements.

In one embodiment, each of the second messages comprises the predetermined previous period.

Since the size of the second ambiguity windows is determined based on uncertainties of range measurements the predetermined previous period, the predetermined previous period represents a period of how long the second messages can be reliable decoded without the reception of a recent first message. If the receiver fails to receive a first message within the predetermined previous period, the receiver can decide that the reconstructed carrier phase measurement is no longer reliable and suspend decoding until another first message is received.

In one embodiment, the processing unit 13 is further configured to determine a time interval between transmissions of two first messages based on at least of data link reliability conditions between the NSS reference station and the NSS rover receivers, a duration of a maximum acceptable transmission interruption between the NSS reference station and the NSS rover receivers, and a rate of change of the relative distance of a satellite to the NSS reference station. The transmission unit transmit at least two first determined time interval.

Figure 9:
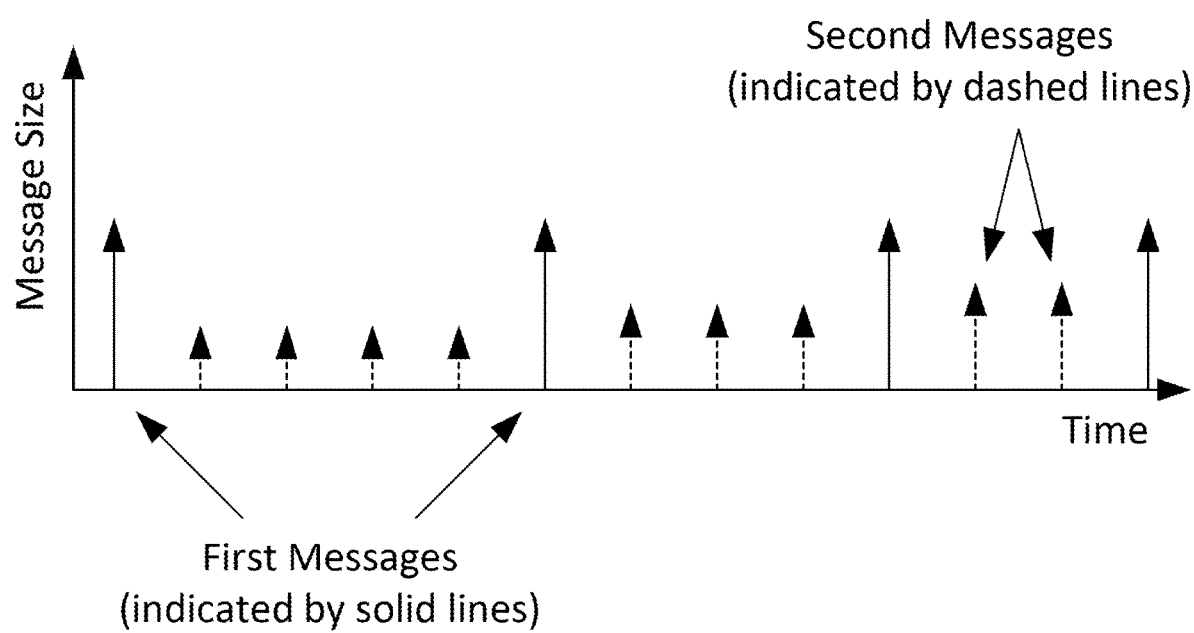
FIG. 9 shows an example of first and second range intervals and message sizes in accordance with some embodiments described herein.

According to this embodiment, the time interval between two first messages is determined to improve the robustness of the data transmission. For example, if the data length reliability conditions worsen, the time interval between two first messages can be reduced. This is shown schematically in the example of FIG. 9.

In one embodiment, the uncertainties are defined by differences between range measurements obtained from carrier phase observations and ranges calculated based on satellite orbit parameters and the NSS reference station location. In other words, the uncertainties are the differences between the measured ranges and the modelled ranges.

In one embodiment, the size of a second ambiguity window used for a second message is larger than the size of a second ambiguity window used for a proceeding second message. Thus, the size of the second ambiguity window increases to account for degrading data link conditions and is therefore dynamically adaptable. Thus, the size of the second messages varies over time, and may increase and decrease. This is shown schematically in the example of FIG. 9. However, using this technique the reliability of the second messages can be further improved.

In one embodiment, the range measurements used for the first message is a range measurement for a first satellite and the first message further comprises a range measurement for at least a second satellite modulo the second ambiguity window. In this embodiment, information with respect to two satellites is transmitted in a single message.

Figure 5:
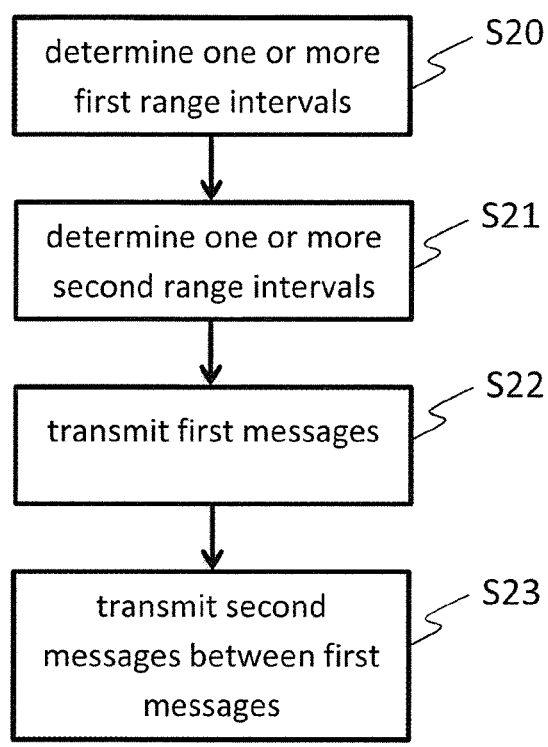
FIG. 5 shows an illustration of a method embodiment of the present invention.

In one embodiment, the range measurement used for the second message is a range measurement a first satellite and the second message further comprises a range measurement for at least a second satellite modulo the first ambiguity window. FIG. 5 shows an illustration of a method embodiment of the present invention.

The method may be performed by a reference station. In step S20, one or more first ambiguity windows are determined based on estimated atmospheric effects. In step S21, one or more second range intervals representing first ambiguity windows are determined based on uncertainties of range measurements within a predetermined previous period. In step S22, first messages each comprising a range measurement modulo a first ambiguity window are transmitted from the NSS reference station to the NSS rover receivers. In step S23, a plurality of second messages are transmitted between transmission of two first messages from the NSS reference station to the NSS rover receiver. Each second message comprises a range measurement modulo one of the determined second ambiguity windows.

Figure 6:
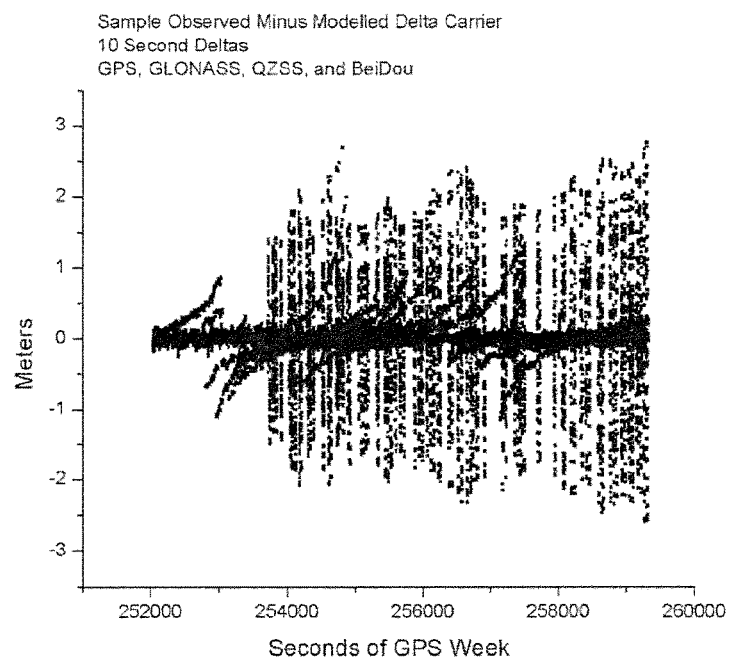
FIG. 6 shows an example of differences between observed and modelled carrier phase measurements over 10 s time intervals. The example is based on GPS, GLONASS, QZSS and BeiDou satellite measurements.

The uncertainties used for determining the size of the second ambiguity windows may be defined by differences between range measurements obtained from carrier phase observations and ranges calculated based on satellite orbit parameters and the NSS reference station location. FIG. 6 shows an example of differences between observed and modelled carrier phase measurements over a 10 s period. Thus, in this case the predetermined previous period is set to 10 s. FIG. 6 illustrates that the largest difference in this period is approximately 3 m. Consequently, the size of the second ambiguity window may for example be conservatively set to 5 m or 10 m. It is advisable to set the second ambiguity window larger than the maximum expected size of the data content, otherwise there is a possibility that the ambiguity in the data may be incorrectly resolved during decoding.

Furthermore, each of the second messages may comprise the predetermined previous period. In the case of FIG. 6 this value is 10 s. When the NSS receiver fails to receive a first message within the predetermined previous period, the NSS receiver can decide not to use the second messages any further until reception of a new first message. This is because the NSS receiver cannot be sure that the uncertainties cause the carrier phase measurements to exceed the size of the second ambiguity window, thereby rendering the range measurement within the second message ambiguous. The predetermined previous period may also be called a recovery period. Hence, the robustness of the transmission can be further improved by transmitting the predetermined previous period.

A detailed example of the encoding and transmission process at the NSS reference station is described in the following with reference to the CMRx format.

The NSS reference station (encoder) picks one NSS band as a reference. For example the L1 band may be chosen for GPS satellites, the B1 band for BeiDou, etc. Data for all other frequency bands are referenced to the reference band. Hence GPS L2, or L5 measurements are sent relative to the L1 reference band. The difference between L1 and L2 delta phase measurements over for example 10 s is normally on the order of a few millimeters due to changes in the ionospheric bias and multipath errors.

In a next step, the NSS reference station selects a satellite for which the RTC data is sent in the full-form CMRx format. The CMRx format uses a first ambiguity window. The size of the first ambiguity window is determined based on atmospheric (ionospheric, tropospheric, etc.) effects. Although atmospheric errors are the main contributions of the uncertainty in the user-satellite range, there are further unmodelled effects that may be considered. In general, the unmodelled errors include: atmospheric, multipath, satellite clock/orbit errors and errors in the reference station coordinates. More than one satellite using the full CMRx format can be selected. The RTC data for the remaining satellites (and bands) is sent in a reduced form which may be called 'tiny' or CMRxt.

Then the NSS reference station looks backward over a predetermined period of data to find the largest difference between modelled and observed delta carrier phase data (i.e. find the satellite that produces the fastest change). This largest difference is then used to determine the size of the ambiguity window used for the tiny messages (the second ambiguity window). The NSS reference station selects an ambiguity window that ensures that it is large enough to cover the expected range of the data. An example of this determination is explained above with respect to FIG. 6 where the size of the second ambiguity window can be for example set to 10 m.

The tiny message contains the following information:
- The size of the second ambiguity window as a table index (e.g. 0=256 cycles, or 1=64 cycles, or 2=32 cycles; 3=16 cycles etc) for all satellites in a constellation. However, the second ambiguity window may not be the same for all satellites;
- The observed carrier phase data is sent modulo the second ambiguity window size for each satellite (except the satellite(s) using the full CMRx format);
- The predetermined previous period (recovery period) value is sent for all satellites in message. The recovery period indicates the maximum time between Full-form CMRx transmissions to allow for unambiguous recovery of Tiny-form (e.g. maximum recovery period=60 seconds). The recovery period is also sent as a table index;
- Non-reference band observations (i.e. GPS L2 band) with respect to the reference band observation for respective satellites. The non-reference carrier phase are sent modulo the second ambiguity window size.

The following example illustrates the calculation of the compressed code phase parameter (PCMRxt) that is sent in the tiny message:

PCMRxt=PObs MOD Ambiguity_Size where:
PCMRxt is the value sent in the message;
PObs is the code phase observed by the NSS reference station sending the tiny message; and
Ambiguity_Size is the second ambiguity.

There are various phenomena that affect the NSS reference station observed code phase (PObs). These include the ionosphere, troposphere, multipath, receiver noise, broadcast orbit inaccuracies and other environmental noise. Therefore, the Ambiguity_Size is chosen to include the worst case effects that the system is expected to operate under as explained above. As an example, below we assume an Ambiguity_Size of 50 meters is large enough to account for the sum of the worst case effects under which the system is still expected to operate.

Assume the NSS reference station observed a code phase value of 23192313.621 meters (range measurement) for a certain satellite. The NSS reference station computes PCMRxt as follows:

PCMRxt=23192313.621 MOD 50.0=13.621

This value is transmitted as part of the tiny message to the rover receiver.

Figure 7:
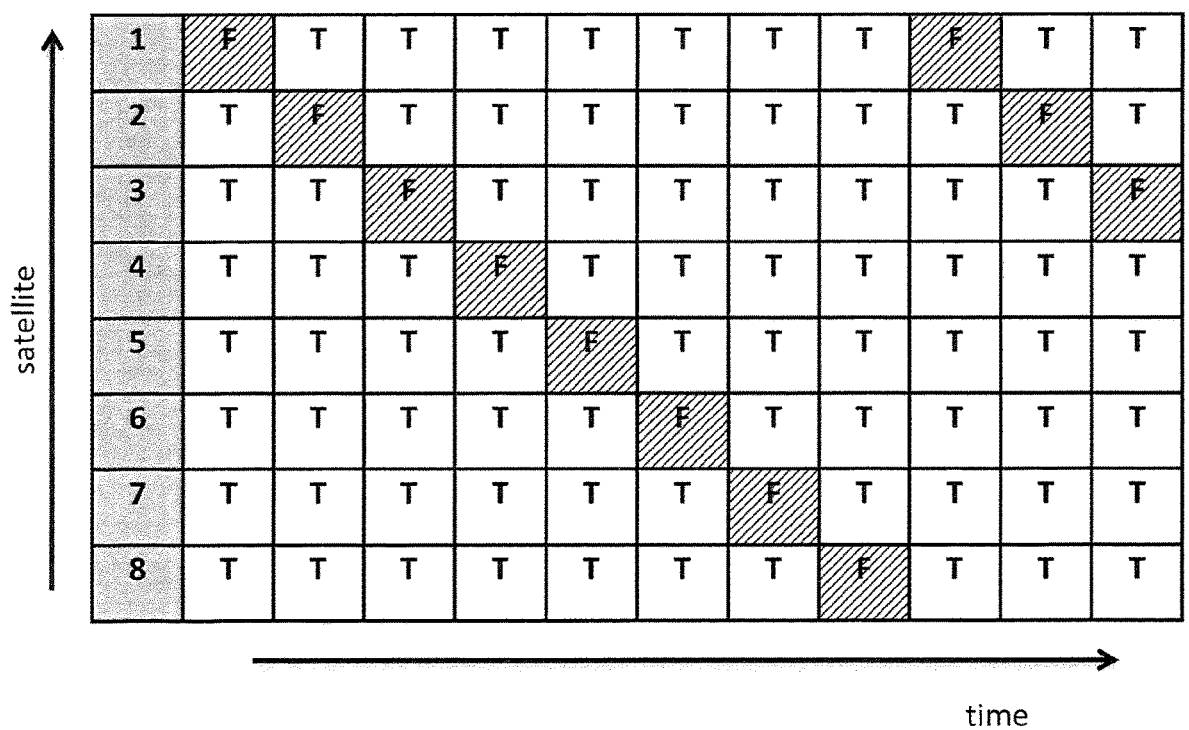
FIG. 7 shows an example of a transmission schedule of the first and second message according to the present invention.

Having transmitted a first message comprising the full message in the CMRx format for one satellite and the tiny message for the remaining satellites, the NSS reference station prepares a second message. The satellite for which the full message is sent may change in the second message. This 'rolling' satellite transmission is shown in FIG. 7. More specifically, FIG. 7 shows an example of a transmission schedule of the messages according to the present invention. FIG. 7 illustrates the case in which RTC data for eight satellites are broadcasted by the NSS reference station.

Data for satellite #1 is sent in the full CMRx format in the first message as indicated by 'F' in FIG. 7. Data for satellites #2 to #8 are sent in the tiny format in the first message as indicated by 'T' in FIG. 7.

Data for satellite #2 is sent in the full CMRx format in the second message as indicated by 'F' in FIG. 7. Data for satellites #1 and #3 to #8 are sent in the tiny format in the first message as indicated by 'T' in FIG. 7.

In other words, the range measurements used for the first message is a range measurement for a first satellite and the first message further comprises a range measurement for at least a second satellite modulo the second ambiguity window.

In other words, the range measurement used for the second message is a range measurement to a first satellite and the second message further comprises a range measurement for at least a second satellite modulo the first ambiguity window.

Data for satellite #3 is sent in the full CMRx format in the third message as indicated by 'F' in FIG. 7. Data for satellites #1, #2 and #4 to #8 are sent in the tiny format in the first message as indicated by 'T' in FIG. 7.

The NSS reference station continues to create full CMRx messages for one satellite one after another.

The NSS reference station changes the satellite using the full format in each message in the example shown in FIG. 7. Hence, the satellites are rolled such that data for each satellite is sent in the full format in a certain time period. The rolling scheme is not limited to the one shown in FIG. 7. The satellites using the full message can be chosen in any way, e.g. randomly or based on reception conditions.

The rolling satellite approach ensures that full and unambiguous GNSS observations are sent for all satellites within a specified period of time (for example 20 seconds). By rolling the sending of the full messages, peaks in the overall message size are avoided. This is beneficial when using radio communications for sending the messages.

A further embodiment relates to a mobile or rover receiver for receiving information from a NSS reference station. A schematic configuration of a rover receiver is shown in FIG.

4. The NSS rover receiver may comprise a reception unit configured to receive, from the NSS reference station, first messages each comprising a range measurement modulo a first range interval representing a first ambiguity window, and receive between reception of two first messages, from the NSS reference station, a plurality of second messages, each second message comprising a range measurement modulo a second range interval representing a second ambiguity window, the second ambiguity window being smaller than each of the first ambiguity windows. The NSS rover receiver may further comprise a processing unit configured to reconstruct a range measurement based on at least a received second message.

A detailed example of the decoding and reception process at the NSS rover receiver is described in the following.

In general, the NSS rover receiver receives first messages each comprising a range measurement modulo a first range interval representing a first ambiguity window. The NSS rover receiver receives, between reception of two first messages, from the GNSS reference station, a plurality of second messages, each second message comprising a range measurement modulo a second range interval representing a second ambiguity window, the second ambiguity window being smaller than each of the first ambiguity windows. Then the NSS rover receiver reconstructs a range measurement based on at least a received second messages.

In one embodiment, the NSS rover receiver performs the following steps to decode the received messages:

Obtaining the NSS reference station position (e.g. in WGS84 Cartesian coordinates) which is transmitted by the NSS reference station.

Obtaining a valid orbit (broadcast or precise) for each satellite—decoded from GNSS satellites at recipient site.

Using satellite orbit information and the NSS reference station position to compute the modelled delta phase between times tx and ty to resolve the ambiguity in the transmitted observation data—i.e. determine the missing windows in each satellite observation.

Using previous full carrier observation at time tx, based on previous Full-form CMRx message, or reconstructed Tiny-form CMRxt message for reformulating the full sender observations.

Non-reference band carrier phase observations are reconstructed based on the reference-band carrier phase observations for each respective satellite.

Consider the above example in which the NSS reference station transmits the value 13.621 in the second message. Assume that the NSS rover receiver computes (models) a range between the NSS reference station and the satellite to be 23192320.254 meters. The NSS rover receiver can do this because the NSS rover receiver knows the position of the antenna of the NSS reference station observing the data, the current time, and the NSS rover receiver has at least one of the broadcast orbits valid during this period.

The NSS rover receiver reconstructs the original code phase as follows:

Step 1: Predicted Range to satellite is 23192320.254.
Step 2: Construct/compute ambiguous range as predicted range divided by ambiguity window, i.e.:
23192320.254/50.0=463846.40508
Truncate result to get an integer number:
463846.40508→463846
Compute ambiguous range as truncated result times ambiguity window, i.e.:
463846.0*50.0=23192300

Step 3: Add received value (PCMRxt) to reconstructed ambiguous range
23192300+13.621=23192313.621

Thus, the NSS rover receiver has reconstructed the full measurement at the NSS reference station.

For most applications of the data the NSS rover receiver only requires the observed minus computed range. However, by fully reconstructing the reference observations, the NSS rover station has the ability to process the reference data in many different ways, i.e. it can be ensured that the RTC scheme does not limit how the reference data is used by the NSS rover receiver.

Figure 8A:
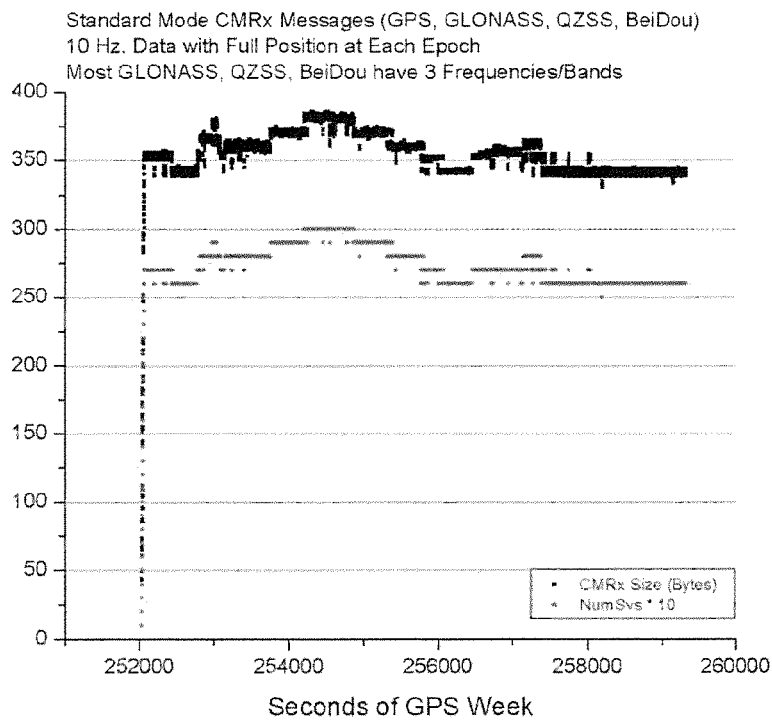
FIG. 8A illustrate the size of data transmissions with the prior art CMRx standard for a given GNSS tracking example.
Figure 8B:
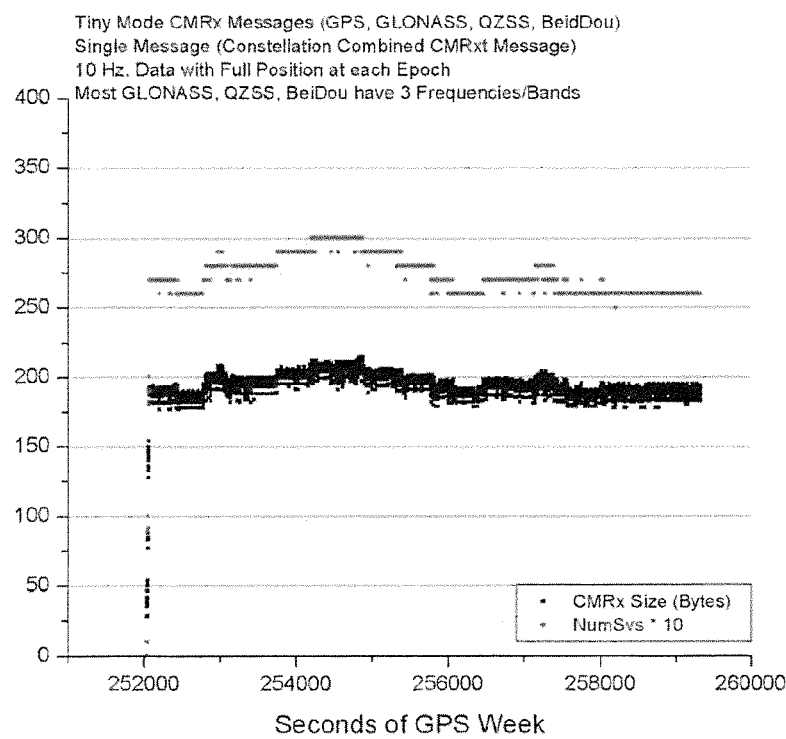
FIG. 8B illustrate the size of data transmissions with the tiny CMRx (CMRxt) standard for the same GNSS tracking example as used in FIG. 8A.

The CMRxt data format enables a very high level of data compression. FIG. 8A illustrate the size of data transmissions with prior art CMRx standard for a given GNSS tracking example. FIG. 8B illustrate the size of data transmissions with tiny CMRx (CMRxt) standard for the same GNSS tracking example as used in FIG. 8A. The CMRxt format leads to roughly a 40% reduction in the data throughput for the same GNSS observation data. Furthermore, the CMRxt approach provides low average and peak data throughput requirements which is beneficial when using radio communications.

The present invention can be used for stationary reference station applications and applications where the reference station is moving.

There is a vast spectrum of industrial high accuracy positioning applications that currently employ rovers using traditional GNSS positioning methods that will benefit from the high compression RTC methods and apparatus that the present invention will provide to GNSS high-precision, real-time NSS positioning applications. These include, but are not limited to: automatic positioning of agricultural machinery, civil construction machinery, and mining machinery; geodetic survey equipment; marine survey equipment; photogrammetry (including airborne platforms both manned and unmanned, the latter referred to as UAVs, unmanned aerial vehicles, or drones); GIS (geographic information system) equipment; and position monitoring systems (such as earthquake detection, bridge monitoring, and dam deformation).

The invention claimed is:

1. A navigation satellite system, NSS, rover receiver for receiving information from a NSS reference station, the NSS rover receiver comprising:
a reception unit configured to:
receive, from the NSS reference station, first messages each comprising a respective first range measurement modulo a first range interval, wherein a time interval between transmission of each first message is equal to or less than a time duration of a predetermined previous time period; and
receive between reception of two first messages, from the NSS reference station, a plurality of second messages, each second message comprising a size of a second range interval, the time duration of the predetermined previous time period, and a respective second range measurement modulo the second range interval, the second range interval being smaller than the first range interval; and
a processing unit configured to reconstruct the second range measurement associated with each second message.

2. The NSS rover receiver according to claim 1, wherein the first range interval is based on estimated atmospheric effects on the first range measurements determined from carrier phase observations.

3. The NSS rover receiver according to claim 1, wherein the second range interval is based on uncertainties of range measurements within the predetermined previous time period, the uncertainties of the range measurements being differences between first range measurements determined from carrier phase observations and second range measurements determined from satellite orbit parameters and a location of the NSS reference station.

4. The NSS rover receiver according to claim 1, wherein a time interval between reception of the two first messages is based on at least one of:
data link reliability conditions between the NSS rover receiver and the NSS reference station; and
a duration of a maximum acceptable interruption between the NSS rover receiver and the NSS reference station.

5. A system comprising:
a NSS rover receiver according to claim 1.

6. Method for receiving information from a navigation satellite system, NSS, reference station at one or more NSS rover receivers, wherein the method comprises the steps of:
receiving, at the NSS rover receiver, first messages each comprising a respective first range measurement modulo a first range interval, wherein a time interval between transmission of each first message is equal to or less than a time duration of a predetermined previous time period;
receiving, at the NSS rover receiver, between reception of two first messages, from the GNSS reference station, a plurality of second messages, each second message comprising a size of a second range interval, the time duration of the predetermined previous time period, and a respective second range measurement modulo the second range interval, the second range interval being smaller than the first range interval; and
reconstructing the second range measurement associated with each of the plurality of second messages.

7. The method according to claim 6, wherein the first range interval is based on estimated atmospheric effects on the first range measurements determined from carrier phase observations.

8. The method according to claim 6, wherein the second range interval is based on uncertainties of range measurements within the predetermined previous time period, the uncertainties of the range measurements being differences between first range measurements determined from carrier phase observations and second range measurements determined from satellite orbit parameters and a location of the NSS reference station.

9. The method according to claim 6, wherein a time interval between reception of the two first messages is based on at least one of:
data link reliability conditions between the NSS rover receiver and the NSS reference station; and
a duration of a maximum acceptable interruption between the NSS rover receiver and the NSS reference station.

10. The method according to claim 6, wherein the size of the second range interval for a second message is larger than the size of the second range interval for a preceding second message.

11. A nontransitory computer readable medium comprising a computer program loadable onto a processing unit of a navigation satellite system, NSS, rover receiver comprising code for executing a method comprises the steps of:
receiving, at the NSS rover receiver, first messages each comprising a respective first range measurement modulo a first range interval, wherein a time interval between transmission of each first message is equal to or less than a time duration of a predetermined previous time period;

receiving, at the NSS rover receiver, between reception of two first messages, from the GNSS reference station, a plurality of second messages, each second message comprising a size of a second range interval, the time duration of the predetermined previous time period, and a respective second range measurement modulo the second range interval, the second range interval being smaller than the first range interval; and reconstructing the second range measurement associated with each of the plurality of second messages.

12. A navigation satellite system, NSS, rover receiver for receiving information from a NSS reference station, the NSS rover receiver comprising:

a reception unit configured to:

receive, from the NSS reference station, first messages each comprising a respective first range measurement modulo a first range interval, wherein the first range interval is based on estimated atmospheric effects on the first range measurements determined from carrier phase observations, and a time interval between transmission of each first message is equal to or less than a time duration of a predetermined previous time period; and receive between reception of two first messages, from the NSS reference station, a plurality of second messages, each second message comprising a size of a second range interval, the time duration of the predetermined previous time period, and a respective second range measurement modulo the second range interval, the second range interval being smaller than the first range interval, wherein the second range interval is based on uncertainties of range measurements within the predetermined previous time period, the uncertainties of the range measurements being differences between first range measurements determined from carrier phase observations and second range measurements determined from satellite orbit parameters and a location of the NSS reference station; and a processing unit configured to reconstruct the second range measurement associated with each second message.

13. The NSS rover receiver according to claim 12, wherein a time interval between reception of the two first messages is based on at least one of:

data link reliability conditions between the NSS rover receiver and the NSS reference station; and a duration of a maximum acceptable interruption between the NSS rover receiver and the NSS reference station.

* * * * *